United States Patent [19]

Campbell

[11] 3,870,687

[45] Mar. 11, 1975

[54] ARYLENE SULFIDE POLYMERS

[75] Inventor: Robert W. Campbell, Bartlesville, Okla.

[73] Assignee: Phillips Petroleum Company, Bartlesville, Okla.

[22] Filed: Nov. 19, 1973

[21] Appl. No.: 416,781

[52] U.S. Cl.................................. 260/79.1, 260/79
[51] Int. Cl............................................. C08g 25/00
[58] Field of Search............................ 260/79, 79.1

[56] References Cited
UNITED STATES PATENTS 3,538,166   11/1970   Campbell et al...................... 260/79

Primary Examiner—Melvyn I. Marquis

[57] ABSTRACT

A method of producing arylene sulfide polymers employing (1) polyhalo-substituted aromatic compounds; (2) sulfur-containing compounds selected from thiocarboxylic acids and thiocarboxylates selected from lithium, sodium, potassium, rubidium, cesium, magnesium, calcium, strontium, and barium thiocarboxylates; (3) bases selected from the hydroxides of lithium, sodium, potassium, rubidium, cesium, magnesium, calcium, strontium, and barium and the carbonates of sodium, potassium, rubidium and cesium; and (4) organic amides.

22 Claims, No Drawings

ARYLENE SULFIDE POLYMERS

This invention pertains to the production of arylene sulfide polymers.

In one of its more specific aspects, this invention pertains to a novel method of producing polymers such as those produced by the method of U.S. Pat. No. 3,354,129.

In U.S. Pat. No. 3,354,129, the disclosure of which is incorporated herein by reference, there is disclosed a method of producing polymers from polyhalo-substituted aromatics, alkali metal sulfides and polar organic compounds. There has now been discovered another method of preparing arylene sulfide polymers.

In accordance with one embodiment of the present invention, arylene sulfide polymers are produced by reacting at least one polyhalo-substituted aromatic compound with a mixture in which at least one sulfur-containing compound selected from thiocarboxylic acids and thiocarboxylates selected from lithium, sodium, potassium, rubidium, cesium, magnesium, calcium, strontium and barium thiocarboxylates, at least one base selected from the hydroxides of lithium, sodium, potassium, rubidium, cesium, magnesium, calcium, strontium and barium, and the carbonates of sodium, potassium, rubidium and cesium and at least one organic amide are contacted. The term "sulfur-containing compound" as used throughout the specification and claims is intended to refer to thiocarboxylic acids and thiocarboxylates as defined herein.

The polyhalo-substituted aromatic compounds which can be employed in the method of this invention are compounds in which the halogen atoms are attached to aromatic ring carbon atoms. Suitable compounds include 1,2-dichlorobenzene, 1,3-dichlorobenzene, 1,4-dichlorobenzene and the other polyhalo-substituted aromatic compounds described and exemplified in the aforementioned U.S. Pat. No. 3,354,129. If desired, mixtures of polyhalo-substituted aromatic compounds can be used.

Sulfur-containing compounds which can be employed in the process of this invention can be represented by the formula $R[CXS(M/y)]_n$, wherein R is a hydrocarbon radical having one to about 20 carbon atoms and a valence of $n$; $n$ is an integer having a value within the range of 1 to 4; each X is selected from oxygen and sulfur; each M is hydrogen or a metal selected from the group consisting of lithium, sodium, potassium, rubidium, cesium, magnesium, calcium, strontium, and barium; and $y$ is equal to the valence of M. Thus, the thiocarboxylic acids and thiocarboxylates which can be used in the process of this invention include monothiocarboxylic acids, monothiocarboxylates, dithiocarboxylic acids, and dithiocarboxylates. If desired, the thiocarboxylate can be produced in situ in an organic amide, for example, by use of the corresponding thiocarboxylic acid and an additional amount of base, sufficient to convert the acid to the salt as described hereinafter. In this instance, it is preferable that water produced in the neutralization reaction be separated by, for example, distillation, prior to the addition of the polyhalo-substituted aromatic compound.

Examples of suitable sulfur-containing compounds include thioacetic acid, sodium thioacetate, calcium thioacetate, dithioacetic acid, lithium dithioacetate, magnesium dithioacetate, thiopropionic acid, sodium thiopropionate, potassium dithiobutyrate, rubidium 2-methylthiohexanoate, cesium 3-phenyldithiooctanoate, lithium 5-cyclopentylthiovalerate, sodium dithioheneicosanoate, cyclohexanecarbothioic acid, potassium cyclohexanecarbothioate, strontium cyclopentanecarbothioate, rubidium 2-methylcyclopentanecarbodithioate, thiobenzoic acid, sodium thiobenzoate, calcium thiobenzoate, cesium 4-ethyldithiobenzoate, sodium thioacrylate, strontium thioacrylate, lithium dithiopropiolate, tetrathiosuccinic acid, sodium tetrathiosuccinate, calcium tetrathiosuccinate, potassium trithioadipate, sodium potassium tetrathiosuberate, rubidium 1,12-dithiodecanedioate, lithium 1,3,5-benzenetricarbothioate, barium 1,2,4-benzenetricarbothioate, sodium 1,2,19,20-eicosanetetracarbodithioate and the like, and mixtures thereof.

Bases which can be employed in the method of this invention include lithium hydroxide, sodium hydroxide, potassium hydroxide, rubidium hydroxide, cesium hydroxide, magnesium hydroxide, calcium hydroxide, strontium hydroxide, barium hydroxide, sodium carbonate, potassium carbonate, rubidium carbonate, cesium carbonate, and mixtures thereof. If desired, the hydroxide can be produced in situ by the reaction of the corresponding oxide with water.

The organic amides used in the method of this invention should be substantially liquid at the reaction temperatures and pressurs employed. The amides can be cyclic or acyclic and can have one to about 10 carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N,N'-ethylenedi-2-pyrrolidone, hexamethylphosphoramide, tetramethylurea, and the like and mixtures thereof.

The components used in the preparation of the arylene sulfide polymer can be introduced into contact in any order. Water which can be present in the composite formed from any of the preceding compounds, for example, the composite formed from the polyhalo-substituted aromatic compound, the sulfur-containing compound, the base and the organic amide or which can be present in a composite formed from the sulfur-containing compound, the base and the organic amide can be removed, for example, by distillation, prior to conducting the polymerization reaction. Such water can be present as an impurity, as a solvent or diluent, as water of hydration or as water produced in a neutralization reaction if the sulfur-containing compound is a thiocarboxylate produced in situ from the corresponding thiocarboxylic acid. Regardless of whether a water removal step is employed, at least a portion of the composition formed from the polyhalo-substituted aromatic compound, the sulfur-containing compound, the base and the organic amide is maintained at polymerization conditions to produce the arylene sulfide polymer.

The ratio of reactants can vary considerably but about 0.9 to about 2, and preferably about 0.95 to about 1.2 gram-moles of the polyhalo-substituted aromatic compound will generally be employed per gram-atom of sulfur in the sulfur-containing compound. The base generally will be employed in an amount within the range of from about 1 to about 3, and preferably from about 1.5 to about 2.5 gram-equivalents per gram-atom of sulfur in the thiocarboxylate salt, if the sulfur-containing compound is employed as the thiocarboxylate salt. When the sulfur-containing compound is employed as the thiocarboxylic acid, an additional one gram-equivalent of base is employed for each gram-equivalent of thiocarboxylic acid used. Thus, more base is required for use with the thiocarboxylic acid than with the corresponding thiocarboxylate salt. As used herein, 1 gram-equivalent of the hydroxides of magnesium, calcium, strontium, and barium represents the same amount as ½ gram-mole of these substances, whereas for the hydroxides of lithium, sodium, potassium, rubidium, and cesium, or for the carbonates of sodium, potassium, rubidium, and cesium, the amount represented by 1 gram-equivalent is considered to be the same as that represented by 1 gram-mole.

The amount of organic amide employed can also vary over a wide range but will generally be within the range of from about 100 grams to about 2,500 grams per gram-mole of polyhalo-substituted aromatic compound employed.

The temperature at which the polymerization can be conducted can vary over a wide range and will generally be within the range of from about 125° C. to about 450° C. and preferably within the range of from about 175° C. to about 350° C. The reaction time will be within the range of from about 10 minutes to about 3 days and preferably from about 1 hour to about 8 hours. The pressure need be only sufficient to maintain the polyhalo-substituted aromatic compound and the organic amide substantially in the liquid phase and to retain the sulfur source therein.

The arylene sulfide polymers produced by the method of this invention can be separated from the reaction mixture by conventional procedures, for example, by filtration of the polymer followed by washing with water, or by dilution of the reaction mixture with water, followed by filtration and water washing of the polymer.

The arylene sulfide polymers prepared by the process of this invention can be blended with fillers, pigments, extenders, other polymers and the like. They can be cured through crosslinking and/or chain extension, for example, by heating at temperatures up to about 480° C. in the presence of a free oxygen-containing gas, to provide cured products having high thermal stability and good chemical resistance. They are useful in the production of coatings, films, molded objects and fibers.

The previous statements are based upon the following examples.

EXAMPLES

In the following examples, values for glass transistion temperature, ($Tg$), and crystalline melting point, ($Tm$), were determined by differential thermal analysis. Values for inherent viscosity were determined at 206° C. in 1-chloronaphthalene at a polymer concentration of 0.4 g/100 ml solution.

EXAMPLE I

To a stirred autoclave were charged 76.1 g (1.0 mole) thioacetic acid, 276.7 g N-methyl-2-pyrrolidone and 123.8 g (3.0 moles of 97 percent assay) sodium hydroxide. The mixture was heated under a slow nitrogen flush to 207° C. over a period of 2 hours and 40 minutes, during which time there was collected 26 ml of distillate containing 11.4 g of water.

After the contents of the autoclave had cooled to 175° C., a solution of 149.9 g (1.02 moles) of p-dichlorobenzene in 50 g of N-methyl-2-pyrrolidone was charged using nitrogen pressure. The system was closed off under nitrogen pressure and the mixture was heated to 245° C. in 20 minutes.

After 3 hours at 245° C. and a pressure of 70–110 psig, the mixture was cooled to about 25° C. and the light gray solid was removed. The solid was washed with distilled water and methanol and dried at 80° C. in a vacuum to obtain 95.1 g of poly(p-phenylene sulfide) having an inherent viscosity of 0.21, a $Tg$ of 80° C and a $Tm$ of 282° C.

EXAMPLE II

To a stirred autoclave were charged 90.14 g (1.0 mole) thiopropionic acid, 123.8 g (3.0 moles of 97 percent assay) sodium hydroxide and 276.7 g N-methyl-2-pyrrolidone. The mixture was heated to 202° C. in 2 hours and 20 minutes during which time there was collected 15 ml of distillate containing 15.0 g of water.

After the contents of the autoclave had cooled to 175° C., a solution of 149.9 g (1.02 moles) of p-dichlorobenzene in 50 g of N-methyl-2-pyrrolidone was charged to the reactor. The system was closed off under nitrogen pressue and the mixture was heated to 245° C. in 25 minutes.

After 3 hours at 245° C. and a pressure of 70–105 psig, the mixture was cooled to about 25° C. and the light gray solid was removed. The solid was washed with water and dried at 80° C. in vacuum to obtain 90.8 g of poly(p-phenylene sulfide) having a $Tg$ of 83° C. and a $Tm$ of 281° C.

EXAMPLE III

To a stirred autoclave were charged 145.5 g (1.0 mole) thiobenzoic acid, 123.8 g (3.0 moles of 97 percent assay) sodium hydroxide and 276.7 g of N-methyl-2-pyrrolidone. The mixture was heated to 190° C in 4 hours under a slow flow of nitrogen during which time there were collected 14 ml of distillate containing 10.3 g of water.

A solution of 149.9 g (1.02 moles) of p-dichlorobenzene in 40 g of N-methyl-2-pyrrolidone was charged to the reactor and the resulting mixture was heated to 245° C. in 15 minutes. After 3 hours at 245° C. and under a pressure of 65–115 psig, the reaction mixture was cooled to about 25° C. The light gray solid was removed and washed with water. The washed solid was then dried in a vacuum oven at 80° C. The powdery product of 97.0 g of poly(p-phenylene sulfide) had an inherent viscosity of 0.15, a $Tg$ of 81° C. and a $Tm$ of 286° C.

EXAMPLE IV

To a stirred autoclave were charged 76.1 g (1.0 mole) thioacetic acid, 122.5 g (3.0 moles of 98 percent assay) sodium hydroxide, 149.9 g (1.02 moles) p-dichlorobenzene, and 326.7 g N-methyl-2-pyrrolidone. Without removal of water, the mixture was placed under a nitrogen atmosphere and heated to 245° C. in 2 hours and 10 minutes. After 3 hours at 245° C. and under a pressure of 110–155 psig, the mixture was cooled to about 25° C., and the solid was removed and washed with hot water. The washed solid was then dried in a vacuum oven at 80° C. to obtain 88.4 g (81.7 percent yield) of poly(p-phenylene sulfide) having an inherent viscosity of 0.18, a $Tg$ of 82° C., and a $Tm$ of 287° C.

EXAMPLE V

To a stirred autoclave were charged 76.1 g (1.0 mole) thioacetic acid, 212.0 g (2 moles) sodium carbonate, and 276.7 g N-methyl-2-pyrrolidone. The mixture was heated under a slow nitrogen flow to 217° C. in 1 hour and 50 minutes, during which time there was collected 2.5 ml of distillate containing 2.49 g water. To the autocalve was then added a solution of 149.9 g (1.02 moles) p-dichlorobenzene in 50 g N-methyl-2-pyrrolidone, and the mixture was heated to 245° C. in 15 minutes. After 3 hours at 245° C. and under a pressure of 65–215 psig, the mixture was cooled to about 25° C. The solid (rusty brown) was removed and washed with cold water, then with hot water. The washed solid was dried in a vacuum oven at 80° C. to obtain 33.1 g (30.6 percent yield) of poly(p-phenylene sulfide) having an inherent viscosity of 0.03, a $Tg$ of 60° C., and a $Tm$ of 262° C.

It will be evident from the foregoing that various modifications can be made to the method of this invention. Such, however, are considered to be within the scope of the invention.

What is claimed is:

1. A method of producing polymers which comprises:
    a. forming a composition by contacting at least one polyhalo-substituted aromatic compound in which the halogen atoms are attached to aromatic ring carbon atoms, at least one sulfur-containing compound selected from thiocarboxylic acids and thiocarboxylates, at least one base selected from the hydroxides of lithium, sodium, potassium, rubidium, cesium, magnesium, calcium, strontium and barium and the carbonates of sodium, potassium, rubidium and cesium, and at least one organic amide, said sulfur-containing compound having the formula $R[CXS(M/y)]_n$, wherein R is a hydrocarbon radical having one to 20 carbon atoms and a valence of $n$; $n$ is an integer having a value within the range of 1 to 4; X is selected from oxygen and sulfur; M is hydrogen or a metal selected from the group consisting of lithium, sodium, potassium, rubidium, cesium, magnesium, calcium, strontium, and barium; and $y$ is the valence of M; and,
    b. maintaining at least a portion of said composition at polymerization conditions to produce said polymer.

2. The method of claim 1 in which said sulfur-containing compound is selected from the group consisting of thioacetic acid, sodium thioacetate, calcium thioacetate, dithioacetic acid, lithium dithioacetate, magnesium dithioacetate, thiopropionic acid, sodium thiopropionate, potassium dithiobutyrate, rubidium 2-methylthiohexanoate, cesium 3-phenyldithiooctanoate, lithium 5-cyclopentylthiovalerate, sodium dithioheneicosanoate, cyclohexanecarbothioic acid, potassium cyclohexanecarbothioate, strontium cyclopentanecarbothioate, rubidium 2-methylcyclopentanecarbodithioate, thiobenzoic acid, sodium thiobenzoate, calcium thiobenzoate, cesium 4-ethyldithiobenzoate, sodium thioacrylate, strontium thioacrylate, lithium dithiopropiolate, tetrathiosuccinic acid, sodium tetrathiosuccinate, calcium tetrathiosuccinate, potassium trithioadipate, sodium potassium tetrathiosuberate, rubidium 1,12-dithiodecanedioate, lithium 1,3,5-benzenetricarbothioate, barium 1,2,4-benzenetricarbothioate, and sodium 1,2,19,20-eicosanetetracarbodithioate.

3. The method of claim 1 in which said polyhalo-substituted aromatic compound is employed in an amount within the range of from about 0.9 to about 2 gram-moles per gram-atom of sulfur in said sulfur-containing compound.

4. The method of claim 1 in which said sulfur-containing compound is a thiocarboxylate and said base is employed in an amount within the range of from about 1 to about 3 gram-equivalents per gram-atom of sulfur in said thiocarboxylate.

5. The method of claim 1 in which said thiocarboxylate is produced by interreaction of the corresponding thiocarboxylic acid and said base in said organic amide.

6. The method of claim 1 in which said organic amide is employed in an amount within the range of from about 100 grams to about 2,500 grams per gram-mole of said polyhalo-substituted aromatic compound.

7. The method of claim 1 in which said polyhalo-substituted aromatic compound is p-dichlorobenzene, said organic amide is N-methyl-2-pyrrolidone, said sulfur-containing compound is thioacetic acid and said base is sodium hydroxide.

8. The method of claim 1 in which said polyhalo-substituted aromatic compound is p-dichlorobenzene, said organic amide is N-methyl-2-pyrrolidone, said sulfur-containing compound is thiopropionic acid and said base is sodium hydroxide.

9. The method of claim 1 in which said polyhalo-substituted aromatic compound is p-dichlorobenzene, said organic amide is N-methyl-2-pyrrolidone, said sulfur-containing compound is thiobenzoic acid and said base is sodium hydroxide.

10. The method of claim 1 in which water is removed from said composition prior to maintaining at least a portion of said composition at polymerization conditions.

11. The method of claim 1 in which said sulfur-containing compound is a thiocarboxylic acid and said base is employed in an amount within the range of from about 1 to about 3 gram-equivalents per gram-atom of sulfur in said acid and said base is employed in an additional amount of 1 gram-equivalent per gram-equivalent of said thiocarboxylic acid.

12. A method of producing a polymer which comprises:
    a. contacting at least one sulfur-containing compound selected from thiocarboxylic acids and thiocarboxylates, at least one base selected from the hydroxides of lithium, sodium, potassium, rubidium, cesium, magnesium, calcium, strontium and barium and the carbonates of sodium, potassium, rubidium and cesium, and at least one organic amide to form a first composition, said sulfur-containing compound having the formula $R[CXS(M/y)]_n$, wherein R is a hydrocarbon radical having one to about 20 carbon atoms and a valence of $n$; $n$ is an integer having a value within the range of 1 to 4; X is selected from oxygen and sulfur; M is hydrogen or a metal selected from the group consisting of lithium, sodium, potassium, rubidium, cesium, magnesium, calcium, strontium and barium; and $y$ is the valence of M;

b. contacting at least a portion of said first composition with at least one polyhalo-substituted aromatic compound in which the halogen atoms are attached to aromatic ring carbon atoms to form a second composition; and, c. maintaining said second composition at polymerization conditions to form said polymer.

13. The method of claim 12 in which said sulfur-containing compound is selected from the group consisting of thioacetic acid, sodium thioacetate, calcium thioacetate, dithioacetic acid, lithium dithioacetate, magnesium dithioacetate, thiopropionic acid, sodium thiopropionate, potassium dithiobutyrate, rubidium 2-methylthiohexanoate, cesium 3-phenyldithiooctanoate, lithium 5-cyclopentylthiovalerate, sodium dithioheneicosanoate, cyclohexanecarbothioic acid, potassium cyclohexanecarbothioate, strontium cyclopentanecarbothioate, rubidium 2-methylcyclopentanecarbodithioate, thiobenzoic acid, sodium thiobenzoate, calcium thiobenzoate, cesium 4-ethyldithiobenzoate, sodium thioacrylate, strontium thioacrylate, lithium dithiopropiolate, tetrathiosuccinic acid, sodium tetrathiosuccinate, calcium tetrathiosuccinate, potassium trithioadipate, sodium potassium tetrathiosuberate, rubidium 1,12-dithiodecanedioate, lithium 1,3,5-benzenetricarbothioate, barium 1,2,4-benzenetricarbothioate, and sodium 1,2,19,20-eicosanetetracarbodithioate.

14. The method of claim 12 in which said polyhalo-substituted aromatic compound is employed in an amount within the range of from about 0.9 to about 2 gram-moles per gram-atom of sulfur in said sulfur-containing compound.

15. The method of claim 12 in which said sulfur-containing compound is a thiocarboxylate and said base is employed in an amount within the range of from about 1 to about 3 gram-equivalents per gram-atom of sulfur in said thiocarboxylate.

16. The method of claim 12 in which said thiocarboxylate is produced by interreaction of the corresponding thiocarboxylic acid and said base in said organic amide.

17. The method of claim 12 in which said organic amide is employed in an amount within the range of from about 100 grams to about 2,500 grams per gram-mole of said polyhalo-substituted aromatic compound.

18. The method of claim 12 in which said polyhalo-substituted aromatic compound is p-dichlorobenzene, said organic amide is N-methyl-2-pyrrolidone, said sulfur-containing compound is thioacetic acid and said base is sodium hydroxide.

19. The method of claim 12 in which said polyhalo-substituted aromatic compound is p-dichlorobenzene, said organic amide is N-methyl-2-pyrrolidone, said sulfur-containing compound is thiopropionic acid and said base is sodium hydroxide.

20. The method of claim 12 in which said polyhalo-substituted aromatic compound is p-dichlorobenzene, said organic amide is N-methyl-2-pyrrolidone, said sulfur-containing compound is thiobenzoic acid and said base is sodium hydroxide.

21. The method of claim 12 in which water is removed from said first composition prior to the contacting of at least a portion of said first composition with said polyhalo-substituted aromatic compound.

22. The method of claim 12 in which said sulfur-containing compound is a thiocarboxylic acid and said base is employed in an amount within the range of from about 1 to about 3 gram-equivalents per gram-atom of sulfur in said acid and said base is employed in an additional amount of 1 gram-equivalent per gram-equivalent of said thiocarboxylic acid.

* * * * *